United States Patent [19]

Fisher et al.

[11] Patent Number: 5,110,246

[45] Date of Patent: May 5, 1992

[54] TWIST-OFF PUSHNUT FASTENER

[75] Inventors: Charles K. Fisher, Belford; Willem J. Steyn, Jackson, both of N.J.

[73] Assignee: TRW Inc., Cleveland, Ohio

[21] Appl. No.: 690,088

[22] Filed: Apr. 23, 1991

[51] Int. Cl.⁵ .................. F16B 37/14; F16B 37/16
[52] U.S. Cl. .................. 411/429; 411/403; 411/437; 411/527
[58] Field of Search .......... 411/403, 525, 526, 527, 411/429, 437, 918, 404

[56] References Cited

U.S. PATENT DOCUMENTS

| | | | |
|---|---|---|---|
| 2,331,608 | 10/1943 | Hathorn | 411/403 |
| 2,837,955 | 6/1958 | Sislik et al. | |
| 2,880,641 | 4/1959 | Sislik | |
| 3,212,391 | 10/1965 | Duffy | |
| 3,215,025 | 11/1965 | Kramer | 411/918 |
| 3,289,523 | 12/1966 | Kramer | 411/918 X |

FOREIGN PATENT DOCUMENTS 51677 7/1941 Netherlands .

Primary Examiner—Neill R. Wilson
Attorney, Agent, or Firm—Fay, Sharpe, Beall, Fagan, Minnich & McKee

[57] ABSTRACT

A hat-shaped push-on fastener for telescopic application to a male member comprises a single piece structure with an annular flange defining a washer-like base and an inverted cup with the bottom of the cup constituting the top of the hat formation. The side wall of the cup is a cylindrical sleeve perpendicular to the washer-like base and adatped to closely surround the male member to which the fastener is telescopically applied. A pair of relatively rigid and inflexible teeth have tips extending radially inward and axially upward. The teeth are located on diametrically opposite sides of the sleeve and are struck inwardly from the metal of the sleeve. The roots of the teeth are at the level of the washer-like base and the ends of the tips are spaced a relatively substantial distance from the top of the hat formation with each tooth being inclined at a slight angle to the axis of the sleeve and arranged such that the end of each tip is tilted to engage the surface of the male member to which it is telescopically applied along an imaginary helical path having the same hand and substantially the same helix angle. An elongated slot is provided for receiving a screw driver for manually rotating said fastener. The slot extends through the bottom of the cup along a diametrical line generally transverse to an imaginary line extending generally diametrically between said pair of teeth with the ends of the slot being spaced radially inwardly from the side wall of the cup.

1 Claim, 1 Drawing Sheet

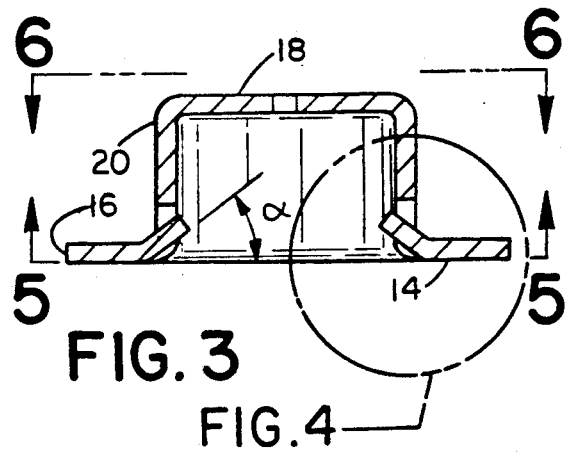
FIG. 1
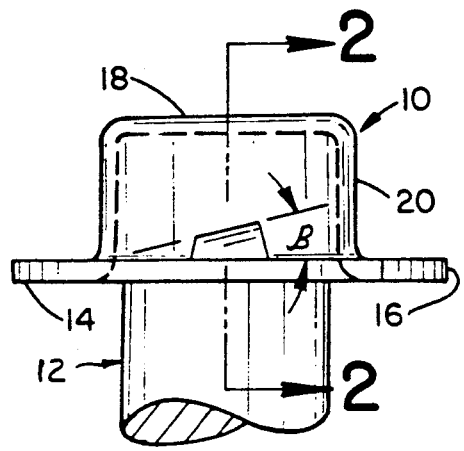
FIG. 3
FIG. 4
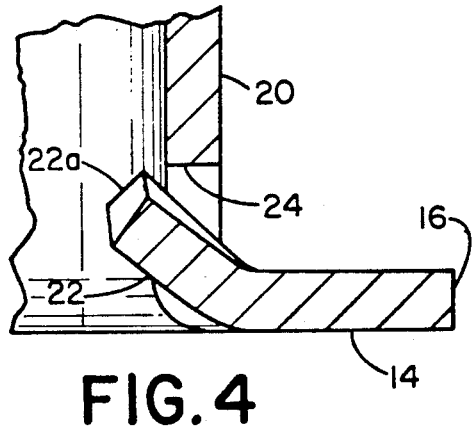
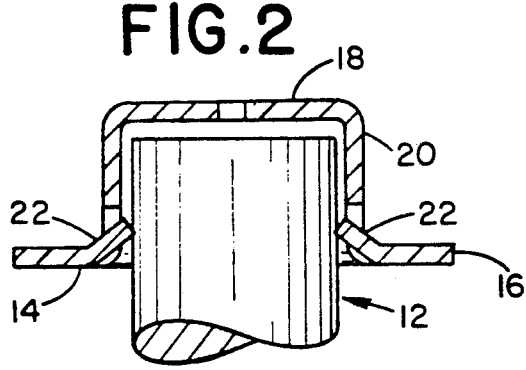
FIG. 2
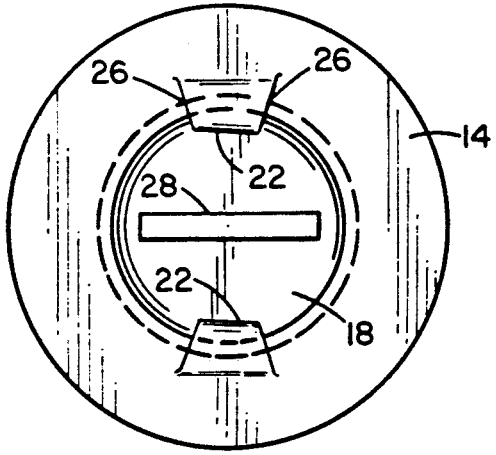
FIG. 5
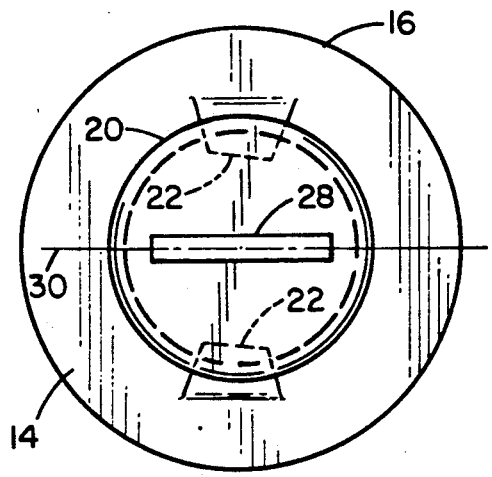
FIG. 6

TWIST-OFF PUSHNUT FASTENER

BACKGROUND OF THE INVENTION

The subject invention is directed toward the art of mechanical fastening devices and, more particularly, to a fastener of the type commonly referred to as a "pushnut".

Pushnut type fasteners are well known and used in many industries to attach all types of components to unthreaded studs or shafts. The fasteners are installed by being axially pushed or hammered over the end of the stud or shaft. The fasteners can be removed only with great difficulty by applying an extremely large axial force. Often removal can result in permanent deformation and/or damage to both the stud and the fastener.

BRIEF DESCRIPTION OF THE INVENTION

The subject invention provides a push-on or push-nut type fastener design which overcomes the above-mentioned difficulties and allows the fasteners to be manually removed readily and without damage to either the fastener or the element to which it is attached. Additionally, the design is such that manual tightening of the fastener is possible by simply rotating the fastener on the stud or shaft.

In accordance with one aspect of the invention, there is provided a hat-shaped push-on fastener for telescopic application to a male stud or shaft member. The fastener is formed of a single piece of sheet metal formed with an annular flange which defines a washer-like base. The single piece of metal also defines an inverted cup with the bottom of the cup constituting the top of the hat formation and the mouth of the cup merging with the washer-like base at the inner circumference thereof. The side wall of the cup is a cylindrical sleeve perpendicular to the washer-like base and sized to closely surround the male member to which the fastener is telescopically applied. A pair of relatively rigid and inflexible teeth having tips extending radially inward and axially outward are located on diametrically opposite sides of the sleeve. The teeth are struck inwardly from the metal of the sleeve and are severed therefrom across the ends of the tips and along their longitudinal edges from the ends of the tips to the washer-like base. The roots of the teeth are at the level of the washer-like base and the ends of the tips are spaced a relatively substantial distance from the top of the hat formation. Each tooth is inclined at a slight angle to the axis of the sleeve and is arranged such that the end of each tip is tilted to engage the surface of the male member to which it is telescopically applied along an imaginary helical path. The end of each tip engages along a helical path having the same hand and substantially the same helix angle as the other tip. The fastener includes an elongated slot for receiving a screw driver for manually rotating the fastener when it is in position. The slot extends through the bottom of the cup along a diametrical line generally transverse to an imaginary line extending generally between the pair of teeth. The ends of the slot are spaced radially inward from the side wall of the cup. The combination of the screw driver slot and the helical inclination of the tips of the teeth allows the fastener to be manually rotated to facilitate removal. Additionally, the combination allows some tightening after the fastener is in position.

The relationship between the slots and the teeth is such that they can cooperate to allow the desired results to be achieved, but because of the relationship of the slot to the location of the fastener teeth, there is no substantial weakening of the fastener. That is, the slot ends and the ends of the teeth and the portion of the cup-shaped body from which the teeth are stamped are located such as to maintain a maximum amount of metal between the two elements and to maintain a full peripheral or circumferential edge about the top of the fastener externally of the ends of the slot.

Accordingly, as can be seen from the foregoing, a primary object of the invention is the provision of a push-on or pushnut type fastener which can be manually removed without damage to the fastener or the element to which it is applied.

A still further object of the invention is the provision of a fastener of the type described which can be made from a single piece of metal using conventional stamping techniques.

Yet another object of the invention is the provision of a cup-shaped, push-on type fastener which includes helically inclined teeth and a screw driver receiving slot which are related in a manner which does not unduly weaken or compromise the structural integrity of the fastener.

Yet another object is the provision of a fastener of the general type described which is simple to use and which can be applied and removed using ordinary hand tools.

BRIEF DESCRIPTION OF THE DRAWINGS

The above and other objects and advantages will become apparent from the following description when read in conjunction with the accompanying drawings wherein:

FIG. 1 is a side elevational view of the preferred embodiment of the fastener of the subject invention showing the fastener applied to the end of a cylindrical shaft or stud element;

FIG. 2 is a cross-sectional view taken on line 2—2 of FIG. 1;

FIG. 3 is a cross-sectional view similar to FIG. 2 but showing the fastener in a non-applied condition;

FIG. 4 is a greatly enlarged showing of the circled area of FIG. 3; and,

FIGS. 5 and 6 are full bottom and top views of the FIG. 3 fastener (the views have been taken on lines 5—5 and 6—5 respectively).

DETAILED DESCRIPTION OF THE PREFERRED EMBODIMENT

Referring more particularly to the drawings wherein the showings are for the purpose of illustrating a preferred embodiment of the invention only, and not for the purpose of limiting same, FIG. 1 shows the overall arrangement of a generally hat-shaped, push-on fastener which is telescopically applied to a male stud or shaft member 12. In the subject showing, the member 12 is illustrated as a smooth surface cylindrical shaft or rod formed of metal. It will be apparent, however, that the fastener of the subject invention could be used on studs, shafts, and similar elements formed from many different materials both metal, ferrous and non-ferrous, as well as plastic. The fastener element 10 is preferably formed through conventional stamping operations from a single, unitary piece of relatively thin spring steel or similar sheet metal.

In the embodiment under consideration, the fastener element 10 has an annular flange 14 with a circular outer peripheral edge portion 16 that defines a somewhat washer-like base for the fastener. The fastener element 10 has an inverted cup-shaped body with the bottom 18 of the cup shape constituting the top of the hat formation and the mouth of the cup merging with the washer-like base at the inner circumference of the base. The side sleeve portion or wall 20 of the cup-shaped body portion is a cylindrical sleeve and is preferably perpendicular to both the bottom 18 and the flange 14. The sleeve portion or side wall 20 is, as mentioned, cylindrical and sized such that, as best shown in FIG. 2, it relatively closely surrounds the male stud or shaft member 12 to which the fastener is telescopically applied.

Of particular importance to the invention is the arrangement of a pair of relatively rigid and inflexible teeth which are designed to engage the outer surface of the shaft member 12 to hold the fastener firmly in place thereon. The teeth are identified with the numeral 22 and are located at diametrically opposite sides of the fastener as best shown in FIGS. 5 and 6. The teeth 22 are struck inwardly from the metal of the sleeve portion 20 and the inner peripheral portion of the flange 14. This relationship can be seen in FIGS. 4 through 6. The metal of the sleeve is severed across the ends of the teeth 22 as shown at 24 in FIG. 4. Additionally, the metal is severed along the lateral sides of the teeth 22 as generally depicted with the numerals 26 in FIG. 5. Note that the severed sides extend from the ends of the teeth tips to the washer-like base with the roots of the teeth 22 being in the level of the base flange 14 and spaced between the outer peripheral edge portion 16 and the inner periphery of the flange 14. It should also be noted that, as best shown in FIGS. 2 and 3, the ends of the tips are spaced a relatively substantial distance axially from the top 18 of the hat formation.

In accordance with the invention, the teeth are each inclined at an angle alpha (see FIG. 3) from the flange 14. This angle can vary within reasonable limits, but is preferably in the range from 30° to 50°. Additionally, the end of each tip is tilted as shown in FIGS. 1 and 4 so that it forms an angle beta with the base flange 14 and lies along an imaginary helical path such that when it is applied to the male stud member 12 and engages the surface thereof, it engages along the same imaginary helical path. Additionally, each of the two diametrically opposed teeth 22 is inclined at substantially the same angles alpha and beta and arranged to engage along a helix of the same hand as its opposed or cooperating tooth. Additionally, the corners or edges 22a which engage the surface of the shaft member 12 are formed to be relatively sharp to "bit" or have a high engagement force.

FIG. 4 illustrates in some detail the location and arrangement of each tooth 22. Note that each individual tooth 22 is deflected radially inward so that its inner edge 22a is normally at a diameter which is less by a pre-determined amount than the normal minimum diameter of the shaft or stud member 12 to which it is to be applied. Thus, when the fastener element 10 is driven onto the stud member 12 as shown in FIG. 2, the axial driving causes the relatively rigid and inflexible tooth to be deflected such that the edge 22a firmly grips and engages the exterior surface of the male stud or shaft member 12. As noted earlier, this engagement takes place along an imaginary helix with a relatively high force.

The fastener element 10 further includes means for allowing it to be manually rotated such that it can be tightened or removed by causing rotation of the teeth 22 relative to the shaft 12 so that the fastener element 10 moves along the imaginary helix line.

The means for applying manual rotation to the fastener element 10 comprises a screw driver slot 28 which is formed through the cup bottom 18 as best illustrated in FIGS. 3, 5, and 6. In particularly, the slot 28 has a width corresponding generally to a normal screw driver bit, and the slot 28 extends completely through the cup bottom 18. Additionally, the width of the slot 28 is adequate for use with standard screw drivers but, preferably, the ends of the slot 28 terminate radially inward from the maximum diameter of the cup bottom 18. This can be seen in FIGS. 5 and 6 and results in a radial thickness (see FIG. 6) of material remaining outwardly of the slot ends. Additionally, it should be noted that the slot 28 is located at a point such that its longitudinal axis 30 is preferably generally perpendicular to an imaginary diametrical line which connects the teeth 22. This assures that the distance between the ends of the slot 28 and the ends of the tooth formation or stamping portion 24 are at a maximum so as to maintain the maximum amount of material therebetween. This assures that the fastener body is not unduly weakened or structurally compromised by the relationship of the slot 28 to the tooth formations 24. Additionally, as can be appreciated, the relationship and the provision of the inclined teeth 22 and screw driver slot 28 allows the fastener element 10 to be manually tightened or removed after installation. Simply by rotating the fastener element 10 and, considering the hand of helix angle, tightening or removal is a simple operation. The relationship and the provision of the cooperating slot 28 and inclined teeth 22 also assures that fastener removal can take place without permanent damage being done to either the fastener element 10 or the stud or shaft member 12 to which it is applied.

The invention has been described with reference to the preferred embodiment. Obviously, modifications and alterations will occur to others upon a reading and understanding of this specification. It is intended to include all such modifications and alterations insofar as they come within the scope of the appended claim or the equivalents thereof.

Having thus described the invention, it is claimed:

1. A hat-shaped push-on fastener for telescopic application to a male member comprising: a single piece of springy sheet metal having: an annular flange defining a washer-like base; an inverted cup with the bottom of the cup constituting the top of the hat formation and the mouth of the cup merging with the washer-like base at the inner circumference thereof, the side wall of the cup being a cylindrical sleeve perpendicular to the washer-like base and adapted to closely surround the male member to which the fastener is telescopically applied; and a pair of relatively rigid and inflexible teeth having tips extending radially inward and axially upward, the teeth being located on diametrically opposite sides of the sleeve and being struck inwardly from the metal of the sleeve and being severed therefrom across the end of the tips and along their longitudinal edges from the ends of the tips to the washer-like base, the roots of the teeth being at the level of the washer-like base and the ends of the tips being spaced a relatively substantial distance from the top of the hat formation, each tooth being inclined at a slight angle top the axis of the sleeve and arranged such that the end of each tip is tilted to engage the surface of the male member to which it is telescopically applied along an imaginary helical path, with the end of each tip engaging along a helical path having the same hand and substantially the same helix angle; and an elongated slot for receiving a screw driver for manually rotating said fastener, said slot extending through the bottom of the cup along a diametrical line generally transverse to an imaginary line extending generally diametrically between said pair of teeth, the ends of said slot being spaced radially inwardly from the side wall of the cup.

* * * * *